United States Patent [19]
Moisio

[11] Patent Number: 5,732,754
[45] Date of Patent: Mar. 31, 1998

[54] TIMBER HARVESTER

[76] Inventor: Juha Moisio, Hiekkarannatie, FIN-44670 Souvanlahti, Finland

[21] Appl. No.: 748,574

[22] Filed: Nov. 13, 1996

[30] Foreign Application Priority Data

Nov. 14, 1995 [FI] Finland ............................ 955475

[51] Int. Cl.$^6$ ............................... A01G 23/08; B27L 1/00
[52] U.S. Cl. .................... 144/24.13; 144/4.1; 144/343
[58] Field of Search .......................... 144/4.1, 24.13, 144/34.1, 338, 343

[56] References Cited

U.S. PATENT DOCUMENTS

| | | | |
|---|---|---|---|
| 4,194,542 | 3/1980 | Eriksson | 144/343 |
| 4,239,067 | 12/1980 | Momonen | 144/338 |
| 4,919,175 | 4/1990 | Samson | 144/343 |
| 4,922,976 | 5/1990 | Hacker | 144/343 |
| 5,058,638 | 10/1991 | Hacker et al. | 144/338 |
| 5,163,489 | 11/1992 | Kebonen | 144/338 |
| 5,219,010 | 6/1993 | Eriksson | 144/343 |

*Primary Examiner*—W. Donald Bray
*Attorney, Agent, or Firm*—Fildes & Outland, P.C.

[57] ABSTRACT

A timber harvester includes a scissors-like frame component including opposing segments with a common joint, a fork-shaped tilting device, a saw device installed at the rear end of the harvester, opposing tree feed devices installed on both of the aforementioned segments, articulated lower delimbing blades driven by an operating device, and at least one upper delimbing blade supported by at least one segment. The upper delimbing blade is secured, with the aid of the first and second sliding members from both segments so that the first sliding members include, in both segments, a linear guide that lies generally in the direction of the segment itself, and slides adapted to the linear guide in the upper delimbing blade. The second sliding members including at least one joint in the upper delimbing blade of the nearest slide, and at least one curved guide in one segment, the second sliding members being arranged to prevent the twisting of the upper delimbing blade.

6 Claims, 5 Drawing Sheets

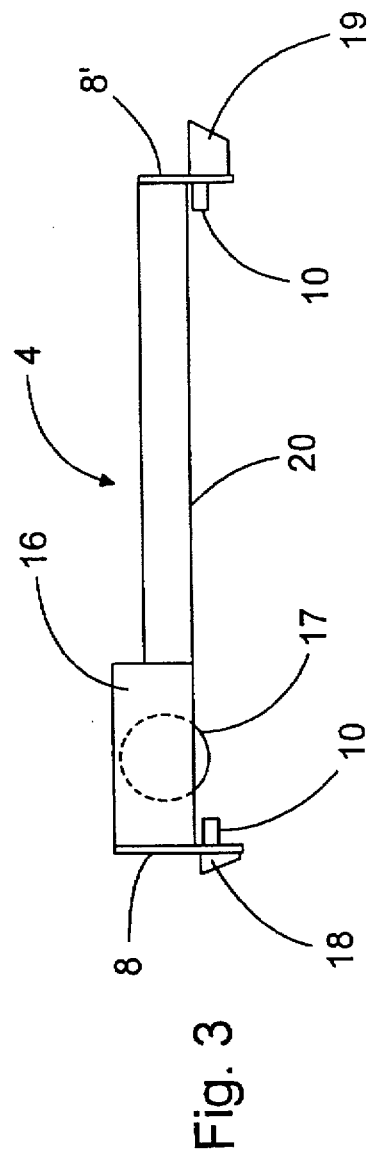
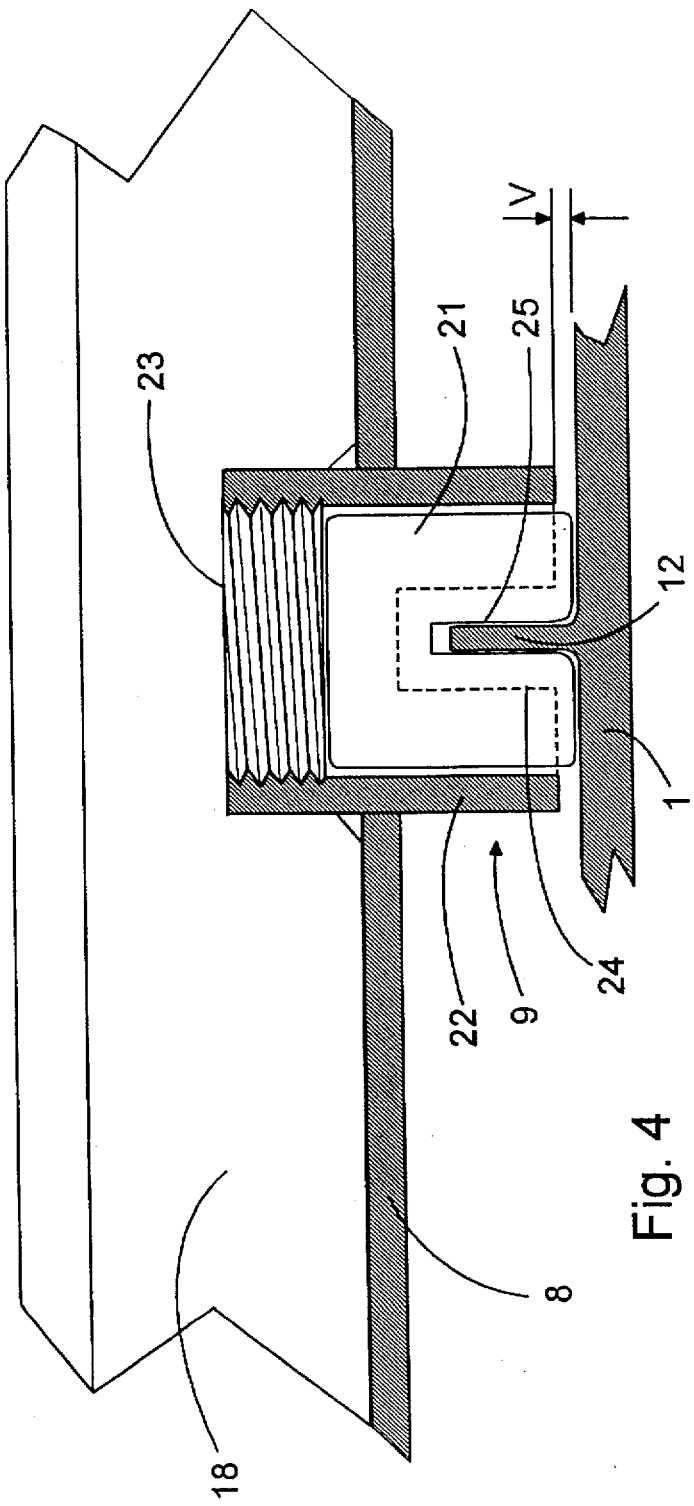

TIMBER HARVESTER

FIELD OF THE INVENTION

The present invention relates to a timber harvester, which includes a scissors-like frame component consisting of opposing segments with a common joint, a fork-shaped tilting device, a sawing device installed at the rear of the harvester, opposing timber feed devices installed on each of the aforementioned segments, lower delimbing blades jointed to at least each segment of the frame at the front of the harvester and driven by operating devices, and at least one upper delimbing blade supported from at least one segment, which delimbing blades create a delimbing throat for the trees being handled.

BACKGROUNF OF THE INVENTION

Several different kinds of timber harvesters are known wherein the felling proper, the delimbing, cutting, and measuring are carried out by a felling grab at the end of an articulated boom. The quality of the timber harvester in question depends largely on its attributes. These attributes include its weight, working speed, method of working that damages the trunk being handled as little as possible, reliability, a need for simple and minimal maintenance, and accuracy of measurement. Publications EP 0535173 and WO 93/03604 describe some models of solutions for the construction of a timber harvester that effectively implement the above goals. An upper delimbing blade that adjusts to the size of the tree has been shown to be useful. Due to the asymmetrical construction, the length measurement is not always accurate, when the size of the tree varies. The tilting device is somewhat complicated and asymmetrical.

SUMMARY OF THE INVENTION

The present invention furthers development in the direction shown by the aforementioned inventions and eliminates deficiencies in known machines.

A timber harvester according to the invention includes a scissors-like frame component comprising opposing segments with a common joint, a fork-shaped tilting device, a saw device installed at the rear end of the harvester, opposing tree feed devices installed on both of the aforementioned segments, articulated lower delimbing blades driven by an operating device, and at least one upper delimbing blade supported by at least one segment, and which delimbing blades form a delimbing throat for the trees being handled.

The upper delimbing blade is secured, with the aid of the first and second sliding members from both segments in such a way that the first sliding members consist, in both segments, of a linear guide that lies generally in the direction of the segment itself, and slides adapted to them in the upper delimbing blade, and that the second sliding members comprise at least one slide, and at least one curved guide in one segment, the second sliding members being arranged to prevent the twisting of the upper delimbing blade and being nearer to the common joint in the upper delimbing blade than the first ones.

The guide of each first sliding member comprises a rail and the slide comprises a pin equipped with a groove set in a collar, which is free to turn to a limited extent within the collar, when the guide slides inside the groove and turns the pin. Each guide of the first sliding members consists of a slot and each slide consists of a pin adapted to this slot. At least two upper delimbing blades disposed at both ends are connected to form a unified component with the aid of a sub-frame.

A jockey wheel is set in the sub-frame for measuring the length of the feed. The sub-frame is formed into a box, with the fork of a tilting device attached to its sides.

With the aid of the invention, each upper delimbing blade is made to move entirely linearly in the direction of the radius of the frame joint. The tilting device can now be advantageously jointed at the sub-frame between the upper delimbing blades; instead of at the scissors frame.

These and other features and advantages of the invention will be more fully understood from the following detailed description of embodiments of a timber harvester taken together with the accompanying drawings.

BRIEF DESCRIPTION OF THE DRAWINGS

In the drawings:

FIG. 3 is a side view of a sub-frame of the harvester connecting upper delimbing blades;

FIG. 4 is a sectional view of a sliding member of the harvester;

DETAILED DESCRIPTION OF THE INVENTION

Figure 1:
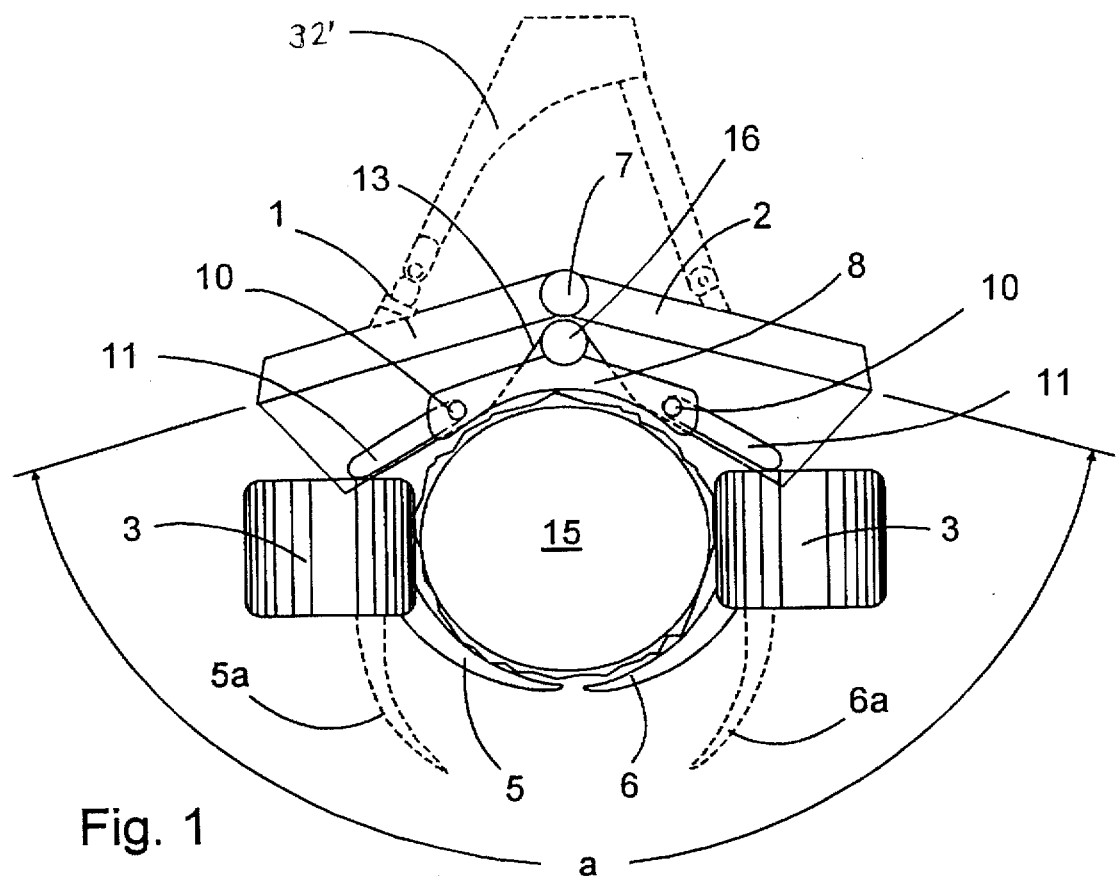
FIG. 1 is a front view of the timber harvester constructed in accordance with the invention illustrated with a tree of nearly maximum size in a delimbing throat of the harvester.

In the timber harvester in FIG. 1, there is a scissors-like frame section, which consists of segments 1 and 2, which are connected by joint 7. Lower blades 5 and 6, which can be turned hydraulically, are connected to these segments. Lower blades 5 and 6 are used to grip a tree to be felled, or a trunk that has already been felled, so that they are turned to the position 5a and 6a shown by the broken line when the grab is completely open. These lower blades 5 and 6 hold the log 15 in place during felling and sawing and delimb the log from below and the side, while the hydraulically rotated drive rollers 3 move the log forward. The Figure uses broken lines to show tilting device 32', which here requires several joints. The saw is joined to the other segment of the rear end (not shown). In the above, the construction corresponds to the timber harvesters described in the PCT publications referred to in the introduction.

The upper edge of the log is delimbed by the upper blade 8. Measurement of the thickness of log 15 is carried out by means of measuring the angle (a) with the aid of a suitable sensor located on the axis 7. The upper blade of the felling grab moves horizontally as a function of the angle (a) restrained by the upper delimbing blade guides 10 in the slots 11 formed vertically in the segments 1 and 2. Slots 11 run generally in the direction of the radius of joint 7, or in other words in the direction of segments 1 and 2 acting as joint arms.

Rotation of the upper delimbing blade 8 is prevented by means of other sliding members, which are set closer to joint 7. These are formed by auxiliary slides 16 set in the upper delimbing blade 8, and by curved guide 13 formed in each segment, which in practice forms a suitably shaped edge surface. The curved guides 13 are dimensioned so that in each opening angle (a) the auxiliary slide 16 has a small tolerance in relation to the curved guides. In practice, it rests on one or other guide; depending on the asymmetrical loading caused by the log.

As such, the other sliding members can also be implemented by a single construction shown in FIG. 4, in which the guide is curved. In theory, the aforementioned curved and straight guides can change places.

Figure 2:
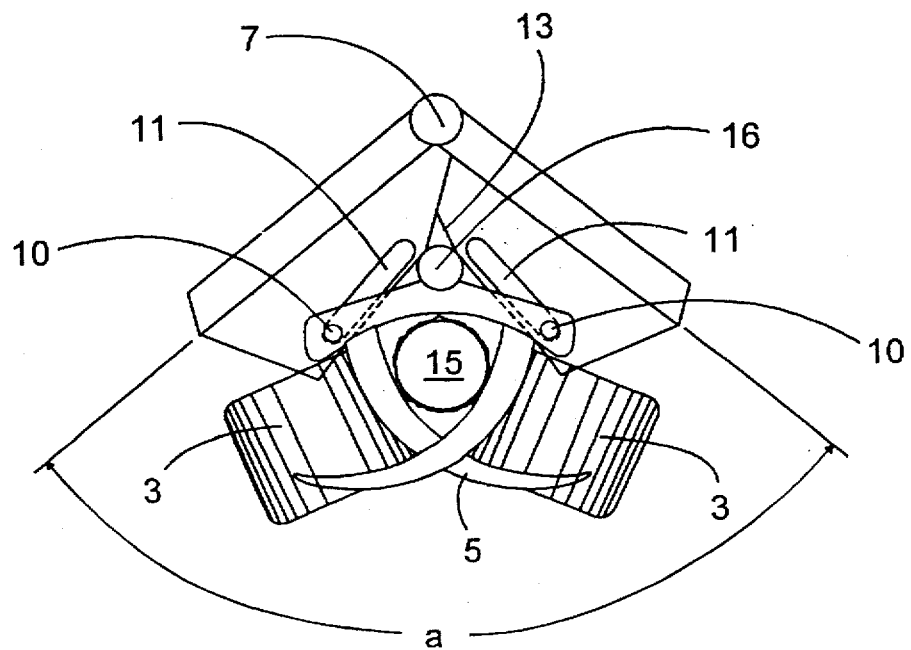
FIG. 2 is another front view of the timber harvester of FIG. 1 illustrated with a narrower part of the tree trunk in its delimbing throat.

FIG. 2 shows a situation, in which the working of trunk 15 has continued from FIG. 1, and the thickness of the log has diminished. Angle (a) has diminished, but the log is within a triangular space formed by the drive rollers 3 and the upper delimbing blade 8. The thickness measurement system includes a programmable measurement unit, which can be calibrated with the actual diameter of the log as a function of the angle (a).

FIG. 3 shows a side view of the construction of the delimbing blades. Front and rear end upper delimbing blades 8 and 8' are attached by bolts to sub-frame 4, thus creating a unified stiff unit according to the figure, in which there is a jockey wheel 17 for measuring the length of the feed. The figure shows the guide pins 9 on one side, which are placed at both ends of the slots of the segments 1 and 2. An anti-rotation slide 16 is installed only at the rear end. The stiffness of the sub-frame 4 of the upper delimbing blade 8 prevents the front end blade from turning. The upper delimbing blades 8 and 8' include the corresponding actual sharpenable delimbing blades 18 and 19.

FIG. 4 shows details of the construction of the preferred form of slide 9. A guide 12 for the plate component is attached to segments 1 and 2, in place of slot 11. Collar 22, inside which is rotatable pin 21, in which in turn there is a suitable groove 25 for guide 12, is welded to the upper delimbing blade 8 (and 8'). Inside collar 22 there is a loose slot 24, which permits guide 25 to turn to a limited extent. The longitudinal tolerance v of delimbing blades 8, 8' is adjusted by setting a threaded plug 23 in collar 22 suitably in each slide 9. This type of sliding joint achieves a precise and lightly moving fit. It is easy to adjust and service the slide.

Figure 5:
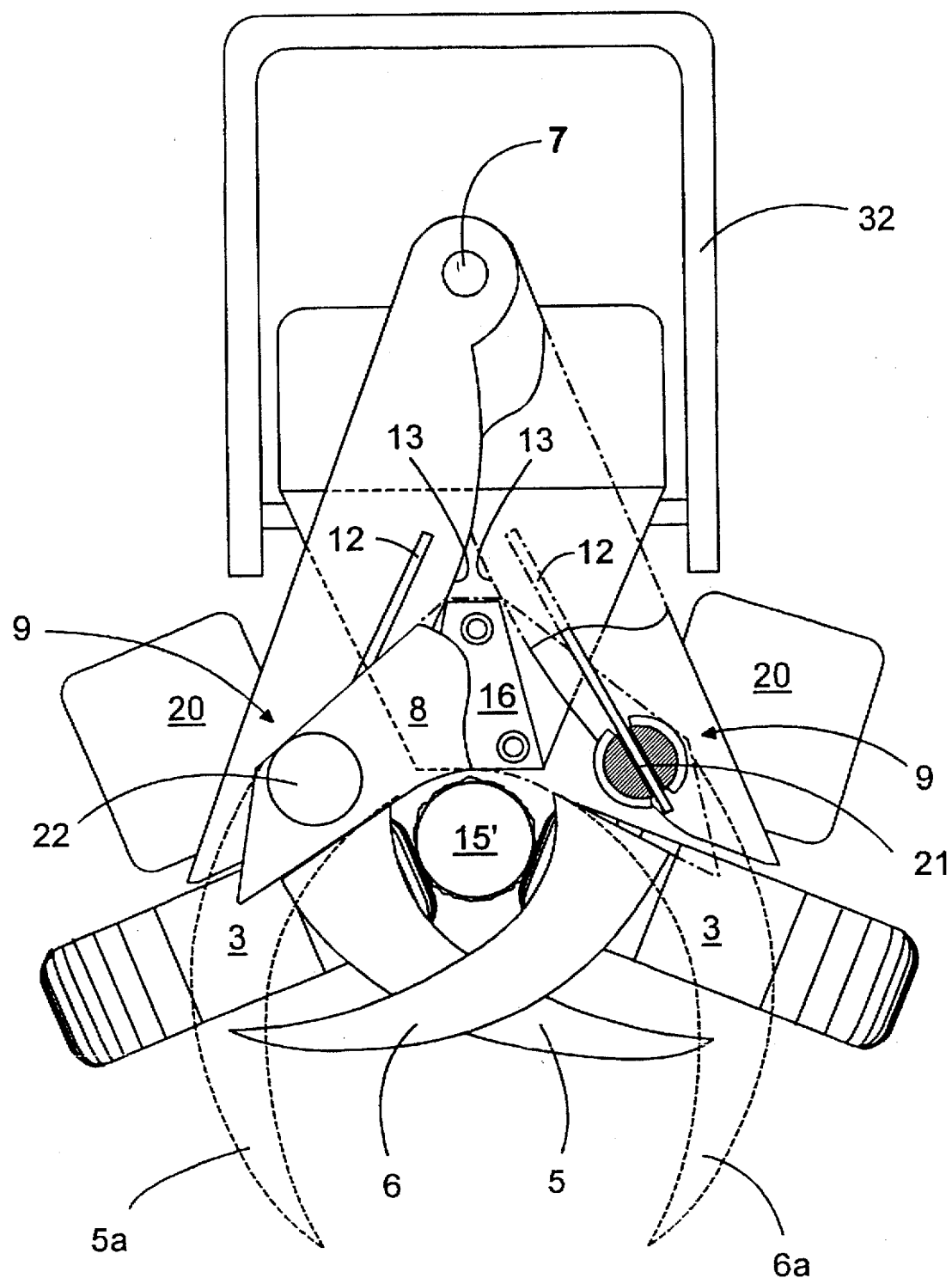
FIG. 5 is a front view of another timber harvester constructed according to the invention.
Figure 6:
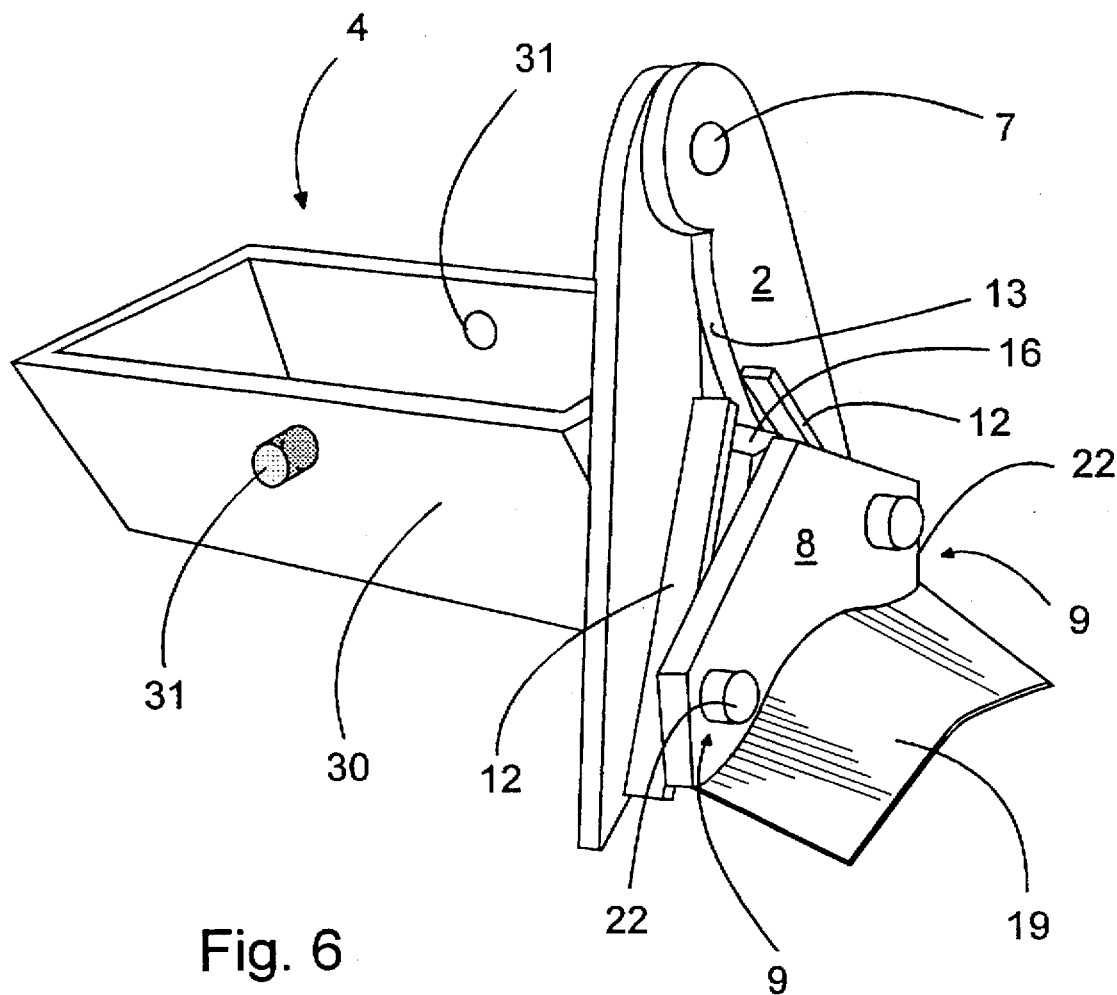
FIG. 6 is a schematic diagram of the principal components of the sub-frame of the timber harvester in FIG. 5.
Figure 7:
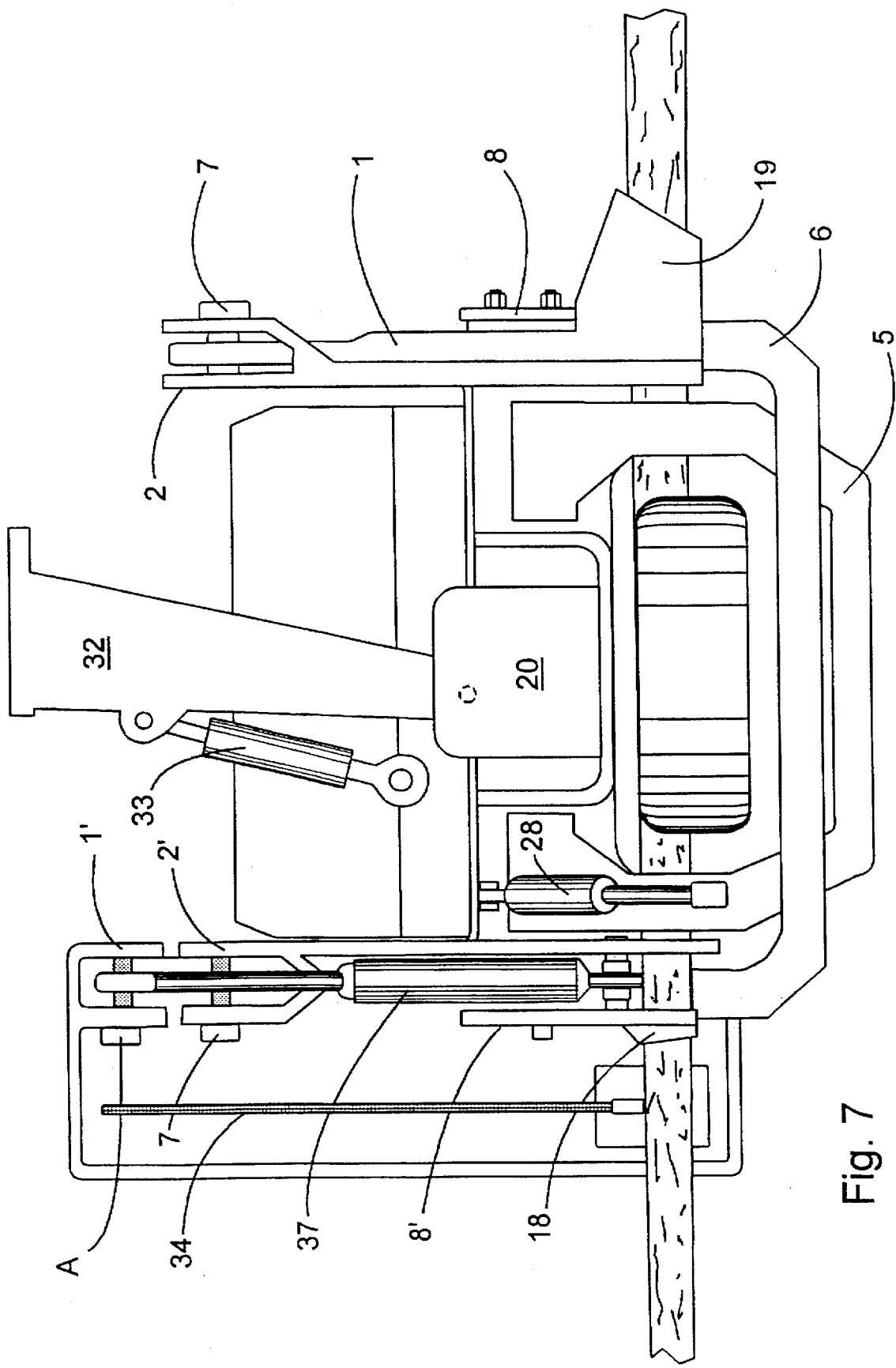
FIG. 7 is a side view of the timber harvester in FIG. 5.

In FIGS. 5-7, the same reference numbers are used for components that are functionally the same as those above. The timber harvester shown in these figures differs from that above in that the frame between the upper delimbing blades 8 and 8' is here formed by the fixed main frame, to which a tilting device and the hydraulics center required by the machine (not shown) can easily be attached. FIG. 5 shows clearly the advantage of this construction that the targeting of the feed rollers 3 and the longitudinal measurement device is maintained even with a tree of small diameter.

Segments 1 and 2 are jointed to one another in a corresponding way to that referred to above, and they support feed rollers 3, whose motors are marked here with reference number 20. The upper delimbing blade is secured with slides 9 according to FIG. 4 to the guides 12 of the segments 1 and 2. The construction of the other sliding members is nearly the same as those above. Slide 16 is composed of a plate component, the upper corners of which slide against curved guides 13, formed by the edges of the plate, of segments 1 and 2. Slide 16 is a permanent part of the box-like sub-frame 4, to which the upper delimbing blades 8 and 8' are firmly attached by bolts. The harvester is assembled by joining segments 1 and 2 together by means of joint 7, after which the delimbing blades 8 and 8' are attached by bolts to the sub-frame 4.

FIGS. 5 and 7 show the fixed fork 32 of the tilting device, which is attached to the box 30 by joint 31 of the sub-frame 4. On top of it there is a cover 35 protecting the hydraulics.

FIG. 6 shows the frame construction of the front part. Segments 1 and 2 of the front end are shown schematically without the lower delimbing blades and feed devices. At the rear there is a corresponding construction with the addition that the saw is attached to one segment and correspondingly there is a rear upper delimbing blade 8' (see FIG. 7) at the other end. FIG. 6 shows the location of the slides 9, the slide 16 that prevents rotation, and correspondingly guides 12 and 13.

FIG. 7 shows the rear end segments 1' and 2', in addition to front end segments 1 and 2. The segments are joined at both sides as independent segments, which support feed roller 3 and its motor 20. FIG. 7 shows saw 34, hydraulic cylinder 33 that drives the tilting fork 32, cylinder 37 that drives the segments, and cylinder 28 that drives the lower delimbing blade 5. The front and rear end lower delimbing blades 5 and correspondingly 6 are connected, so that the device can be used to load logs in the same way as a conventional grab.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A timber harvester having front and rear ends, the front end including a scissors-like frame component comprising opposing segments with a common joint, a fork-shaped tilting device, opposing tree feed devices installed on both of the said segments, articulated lower delimbing blades driven by an operating device, and at least one upper delimbing blade supported by at least one segment, and which delimbing blades form a delimbing throat for the trees being handled, the rear end including a saw device installed thereon, characterized in that;

the upper delimbing blade is secured in part by first and second sliding members from both segments, the first sliding members comprising a linear guide that lies generally in the direction of the segment itself, and slides connecting the upper delimbing blade to said linear guide, the second sliding members comprising at least one slide and one curved guide in one segment, the second sliding members being arranged to prevent the twisting of the upper delimbing blade and being nearer to the common joint in the upper delimbing blade than the first ones.

2. A timber harvester according to claim 1, characterized in that:

the guide of each first sliding member comprises a rail and the slide comprises a pin equipped with a groove set in a collar, which is free to turn to a limited extent within the collar, when the guide slides inside the groove and turns the pin.

3. A timber harvester according to claim 2, characterized in that:

each guide of the first sliding members consists of a slot and each slide consists of a pin adapted to this slot.

4. A timber harvester according to claim 1, characterized by:

at least two upper delimbing blades at both ends and that these are connected to form a unified component with the aid of a sub-frame.

5. A timber harvester according to claim 4, characterized by:

a jockey wheel set in the sub-frame for measuring the length of the feed.

6. A timber harvester according to claim 5, characterized in that:

the sub-frame is formed into a box, with the fork of a tilting device attached to its sides.

* * * * *